United States Patent
Bjorklund et al.

(10) Patent No.: US 9,019,060 B2
(45) Date of Patent: Apr. 28, 2015

(54) ELECTRICAL CONDUCTOR WITH SURROUNDING ELECTRICAL INSULATION

(71) Applicants: Anders Bjorklund, Vasteras (SE); Henrik Hillborg, Vasteras (SE); Fredrik Sahlen, Vasteras (SE)

(72) Inventors: Anders Bjorklund, Vasteras (SE); Henrik Hillborg, Vasteras (SE); Fredrik Sahlen, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/718,726

(22) Filed: Dec. 18, 2012

(65) Prior Publication Data

US 2013/0099621 A1    Apr. 25, 2013

Related U.S. Application Data

(63) Continuation of application No. PCT/EP2011/060332, filed on Jun. 21, 2011.

(60) Provisional application No. 61/357,142, filed on Jun. 22, 2010.

(51) Int. Cl.

| H01F 27/30 | (2006.01) |
|---|---|
| H01B 7/28 | (2006.01) |
| H01F 27/32 | (2006.01) |
| H02K 3/30 | (2006.01) |
| B82Y 30/00 | (2011.01) |
| H01B 7/02 | (2006.01) |

(52) U.S. Cl.
CPC ............... *H01B 7/0291* (2013.01); *B82Y 30/00* (2013.01); *H01B 7/0216* (2013.01); *H01B 7/2813* (2013.01); *H01F 27/32* (2013.01); *H02K 3/30* (2013.01); *Y10S 977/902* (2013.01)

(58) Field of Classification Search
USPC ...... 336/90, 96, 206–208; 174/117 FF, 119 R
See application file for complete search history.

(56) References Cited

U.S. PATENT DOCUMENTS

| 4,760,296 | A |   | 7/1988  | Johnston et al. |         |
|-----------|---|---|---------|-----------------|---------|
| 4,935,302 | A | * | 6/1990  | Hjortsberg et al. | 428/383 |
| 5,372,886 | A | * | 12/1994 | Inazawa et al.  | 428/384 |

(Continued)

FOREIGN PATENT DOCUMENTS

| CN | 1384138 A | 12/2002 |
|---|---|---|
| CN | 1489769 A | 4/2004 |

(Continued)

OTHER PUBLICATIONS

DuPont(TM) Voltron(R) E3597 Technical Data Sheet; (C)2008 DuPont All Rights Reserved; 4 pages.

(Continued)

*Primary Examiner* — Tuyen Nguyen
(74) *Attorney, Agent, or Firm* — St. Onge Steward Johnston & Reens LLC

(57) ABSTRACT

An electrical conductor provided with an electrical insulation system surrounding the conductor, the insulation includes a first insulation layer surrounding the conductor and a second insulation layer surrounding the first insulation layer. The second insulation layer includes a second polymer and a second filler in the form of chromium oxide ($Cr_2O_3$), iron oxide ($Fe_2O_3$), or a mixture of chromium oxide and iron oxide, wherein the first insulation layer includes a first polymer and a first filler including dispersed nanoparticles.

17 Claims, 2 Drawing Sheets

(56) References Cited

U.S. PATENT DOCUMENTS

| | | | |
|---|---|---|---|
| 5,468,557 A * | 11/1995 | Nishio et al. | 428/384 |
| 6,403,890 B1 * | 6/2002 | McGregor et al. | 174/120 R |
| 6,908,692 B1 | 6/2005 | Bohm et al. | |
| 6,989,173 B2 * | 1/2006 | Smith et al. | 427/140 |
| 7,253,357 B2 * | 8/2007 | Cipelli et al. | 174/36 |
| 7,459,627 B2 | 12/2008 | Lee et al. | |
| 7,884,149 B2 | 2/2011 | Nelson et al. | |
| 2002/0164542 A1 | 11/2002 | Oshio et al. | |
| 2004/0031620 A1 | 2/2004 | Lerchenmueller et al. | |
| 2004/0058822 A1 | 3/2004 | Ohmatsu | |
| 2005/0133863 A1 | 6/2005 | Werner et al. | |
| 2005/0168800 A1 | 8/2005 | Hiraoka et al. | |
| 2007/0117911 A1 | 5/2007 | Irwin et al. | |
| 2007/0199729 A1 | 8/2007 | Siegel et al. | |
| 2008/0143465 A1 | 6/2008 | Tan et al. | |
| 2009/0001893 A1 | 1/2009 | Cleland et al. | |
| 2010/0081744 A1 | 4/2010 | Cancilleri et al. | |
| 2010/0101828 A1 | 4/2010 | Duarte Pena et al. | |
| 2011/0061891 A1 | 3/2011 | Schadler et al. | |
| 2013/0025909 A1 * | 1/2013 | Perego et al. | 174/116 |

FOREIGN PATENT DOCUMENTS

| | | | |
|---|---|---|---|
| CN | 1591843 A | 3/2005 | |
| CN | 1648758 A | 8/2005 | |
| CN | 1992100 A | 7/2007 | |
| CN | 101236826 A | 8/2008 | |
| CN | 101286384 A | 10/2008 | |
| CN | 101375424 A | 2/2009 | |
| CN | 101572455 A | 11/2009 | |
| DE | 10 2009 039 454 A1 * | 3/2011 | |
| EP | 0356929 A1 | 3/1990 | |
| EP | 1166283 B1 | 10/2003 | |
| EP | 1790460 A1 | 5/2007 | |
| JP | S63250010 A | 10/1988 | |
| JP | H02106812 A | 4/1990 | |
| JP | H0583936 U | 11/1993 | |
| JP | H11126517 A | 5/1999 | |
| JP | 2001307557 A | 11/2001 | |
| JP | 2005112908 A | 4/2005 | |
| JP | 2008251295 A | 10/2008 | |
| WO | 0054286 A1 | 9/2000 | |
| WO | 2005036563 A2 | 4/2005 | |

OTHER PUBLICATIONS

International Search Report & Written Opinion of the International Searching Authority Application No. PCT/EP2011/060332 Completed: Aug. 16, 2011; Mailing Date: Aug. 25, 2011 9 pages.
Voltron(TM)—A New Generation of Wire Enamel for the Manufacture of Magnet Wires for Inverter Fed Motors; 6 pages; Undated.
Translation of Japanese Notice of Reasons for Rejections Application No. 2013-515861 Issued: Oct. 29, 2013 2 pages.
Translation of Japanese Notice of Reasons for Rejection Application No. 2013-515861 Issued: Feb. 25, 2014 4 pages.
The Patent Office of the People's Republic of China First Office Action Application No. 201180029276.7 Issued: Sep. 12, 2014 12 pages.

* cited by examiner

ELECTRICAL CONDUCTOR WITH SURROUNDING ELECTRICAL INSULATION

FIELD OF THE INVENTION

The present invention relates to an electrical conductor provided with a surrounding electrical insulation system.

BACKGROUND OF THE INVENTION

Electrical conductors provided with an electrical insulation in the form of a varnish filled with particles of chromium oxide ($Cr_2O_3$) or iron oxide ($Fe_2O_3$) are known to provide excellent resistance against partial discharges. These types of insulated electrical conductors are typically used in electrical motors and are then referred to as enameled wires.

EP 356 929 A1, hereby incorporated by reference, gives an example of an enameled wire that has an insulating coating system comprising a basecoat and a topcoat. The topcoat comprises an organic polymer of, for example, polyesteramide (PEA) and a filler in the form of chromium oxide particles or iron oxide particles with an average particle size of 0.005-30 µm, preferably 0.15-10 µm. The topcoat is applied on a basecoat of polyester or polyesterimide (PEI) surrounding the conductor. The amount of chromium oxide particles must be high enough for forming a percolated structure. By this an intrinsic resistivity of $10^4$-$10^8$ ohm m is achieved in the topcoat, which will electrically shield the insulation system under electrical discharges. Thereby the initiation of electrical erosion of the insulating coating is prevented. Once the top-coat is penetrated or cracked, electrical erosion proceeds rather fast through the basecoat. One disadvantage with the above described type of insulation system is that with increased requirements on the insulating coating to withstand high electrical fields a higher amount of chromium oxide is required. With this higher amount of chromium oxide the mechanical properties of the insulation system are decreased. As the coated wire is subject to bending, for example, during the manufacturing of motors, it is necessary that insulation system has excellent mechanical properties, such as excellent bending strength.

Especially for low-voltage frequency-converter controlled motors there are increased requirements on the conductor insulation coating to withstand flash-over voltages that can give rise to partial discharges in the insulation system of the conductor, and subsequently possible electrical erosion of the insulation system. There is therefore a need for an electrical insulation system for metallic conductors, such as wires, that have a similar or higher resistance against partial discharges than insulation systems of today.

SUMMARY OF THE INVENTION

One object of the invention is to provide an insulated electrical conductor with high resistance against partial discharges in the electrical insulation system. Another object of the invention is to improve the mechanical performances of the electrical insulation system of the insulated electrical conductor.

Those objects are achieved by providing an electrical conductor provided with an electrical insulation system surrounding the conductor, the insulation system comprises a first electrical insulation layer surrounding the conductor and a second electrical insulation layer surrounding the first insulation layer. The second insulation layer comprises a second polymer and a second filler in the form of chromium oxide ($Cr_2O_3$), iron oxide ($Fe_2O_3$), or a mixture of chromium oxide and iron oxide, wherein the first insulation layer comprises a first polymer and a first filler comprising dispersed nanoparticles.

The nanoparticles are preferably well-dispersed in the first polymer, which means that the dispersion of the nanoparticles in the first polymer can be conducted in any conventional way, as long as the dispersion is carried out such that agglomeration is minimized and the nanoparticles are substantially homogenously distributed in first polymer.

By an insulation system combining the first insulation layer with well dispersed nanoparticles and the second insulation layer filled with chromium oxide particles and/or iron oxide particles an excellent shield and resistance of the insulation system against electrical discharges is obtained and thereby an increased life time of the insulated conductors. The chromium oxide and/or iron oxide filler is believed to increase the electrical conductivity in the surface layer of the first insulation layer sufficiently for the extremely concentrated effect of a corona discharge to be dissipated over a large surface, thus reducing the effect of the corona discharge considerably.

Further, the bending strength of the electrical insulation system is improved compared to prior art conductors having an insulation system of a chromium oxide and/or iron oxide filled polymer matrix. The first electrical insulation layer comprising nanoparticles arranged between the conductor and the second electrical insulation layer is more ductile than the second insulation layer and will therefore improve the flexibility of the entire electrical insulation system.

The first electrical insulation layer comprising nanoparticles would also make it possible to use a lower chromium oxide and/or iron oxide content in the second insulation layer than in known insulation systems comprising chromium oxide and/or iron oxide, because even if the second electrical insulation layer is cracked due to partial discharges, the first insulation layer, i.e. the layer located between the conductor and the second insulation layer, will still give the insulation system a high resistance against partial discharges.

According to one embodiment the second filler of chromium oxide and/or iron oxide is present in an amount of 10-40% of the volume of the second insulation layer, preferably 10-30% of the volume of the second insulation layer. Thereby an improved shielding against partial discharges is obtained and also an improved mechanical performance of the entire insulation system.

According to one embodiment the second filler has an average particle size of 0.005-30 µm, preferably 0.010-15 µm, most preferably 0.15-10 µm. By this embodiment a further improved shielding against partial discharges is obtained.

According to one embodiment the second filler has a resistivity of $10^4$-$10^8$ ohm.

According to one embodiment the second polymer is at least one of the following polymers: polyesters, polyesterimides, polyamideimides, polyesteramides, polyimides, polyurethans, epoxy and polyamides.

According to one embodiment the second insulation layer has a thickness of 5-50 µm.

According to one embodiment the first polymer is at least one of the following polymers: polyesters, polyesterimides, polyamideimides, polyesteramides, polyimides, polyurethans, epoxy and polyamides.

According to one embodiment of the invention the nanoparticles comprises at least any of the following: Silicon dioxide (Silica, $SiO_2$), Aluminium oxide (Alumina, $Al_2O_3$), Zinc oxide (ZnO), Titanium dioxide ($TiO_2$), Barium titanate ($BaTiO_3$), Magnesium oxide (MgO) and Montmorillonite (MMT) clay.

According to one embodiment the nanoparticles are grafted to the polymer matrix. The well dispersed and chemically bonded nanoparticles in the polymer matrix of the first insulation layer result in a further improved resistance against partial discharges as well as a ductile material with excellent bending strength. Upon mechanical deformation of the conductor, such as a wire, no voids are formed between the particles and the polymer matrix within the insulation layer. The absence of voids, in combination with the erosion-resistant filler, such as for example silicon dioxide ($SiO_2$), results in low electrical erosion during partial discharges.

According to one embodiment the nanoparticles in the first insulation layer are present in an amount of 1-40% of the volume of the first layer. Thereby an improved resistance against partial discharges is obtained and also an improved mechanical performance of the entire insulation system.

According to one embodiment the nanoparticles in the first insulation layer have an average particle size of 1-200 nm. Thereby an improved resistance against partial discharges is obtained and also an improved mechanical performance of insulation system.

According to one embodiment the first insulation layer has a thickness of 20-120 μm.

According to one embodiment the thickness of the second insulation layer is 10-25%, preferably 15-20% of the thickness of the first insulation layer. By this ratio between the first and second insulation layer the mechanical properties and bending strength of the insulation system is further improved.

According to one embodiment the second insulation layer is surrounding the first insulation layer and is applied directly on the first insulation layer, such that it is in contact with the first insulation layer.

According to one embodiment the insulation system is an enameled insulation system.

According to one embodiment an additional layer is arranged between the first insulation layer and the second insulation layer. The additional layer is, for example, applied to improve the adhesion between the first and second layer. According to one embodiment of the invention the additional layer has a thickness that is thinner than the first or second insulation layer.

According to one embodiment an electrical motor with a winding or coil comprising an electrical conductor is provided with an electrical insulation system surrounding the electrical conductor. The motor is preferably a low-voltage electrical motor. According to one embodiment the electrical motor is a low voltage frequency-converter controlled electrical motor. According to one embodiment a transformer is provided with a winding comprising an electrical conductor. As the electrical conductor according to any of the above described embodiments has proven to have excellent resistance against partial discharges, the properties of an electrical motor, transformer or other electrical equipment comprising a coil or winding of the electrical conductor will also be improved.

BRIEF DESCRIPTION OF THE DRAWINGS

The invention will be explained in greater detail by description of embodiments with reference to the accompanying drawings, wherein.

DETAILED DESCRIPTION OF THE INVENTION

Figure 1:
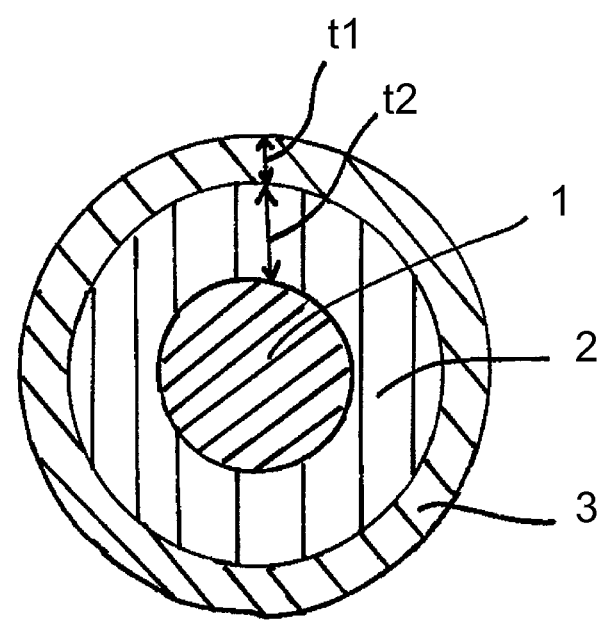
FIG. 1 is a cross-section of an insulated conductor according to a first embodiment of the present invention.

FIG. 1 shows a cross-section of an electrically insulated conductor 1 where the conductor in the form of a metallic wire is surrounded by an electrical insulation system comprising a first electrical insulation layer 2, comprising a polymer matrix with well dispersed nanoparticles of silica. The silica is grafted to the polymer matrix, for example, polyester or polyesterimide (PEI). The nanoparticles have an average particle size of 1-200 nm.

A second electrical insulation layer 3 comprising a polymer matrix of polyesteramide filled with chromium oxide ($Cr_2O_3$) having an average particle size of 0.15-10 μm is surrounding the first insulation layer.

The metallic wire according to this embodiment has a round cross section and is made of copper; however other forms of the conductor, such as profiled wire, and other conventional conductor materials, such as aluminium may also be used.

The coating is applied in a conventional manner letting the wire pass multiple times through a coating bath comprising a varnish with filler, subsequent wiping dies or felts, and a heating device for curing the coating.

For applying the first layer 2 on the conductor 1 the wire is typically passed through the coating bath comprising a varnish of the first polymer and the well dispersed nanoparticles, and thereafter the subsequent wiping and heating steps. This is repeated 8-12 times, such that a thickness (t1) of 20-120 μm is obtained for the first insulation layer.

The second insulation layer 3 is applied in a corresponding way by letting the wire with the first insulation layer 1 pass through a coating bath with the varnish of the second polymer and the second filler, typically chrome oxide, and thereafter the subsequent wiping and heating steps. This is repeated 2-3 times, such that a thickness (t2) of 5-50 μm is obtained for the second layer.

The number of coatings layers of the first insulation layer 2 and the second insulation layer 3 depends on the voltage level on the motor for which the enameled wire is to be used. The total thickness of the insulation layer for an enameled wire is usually referred to as a specific insulation grade.

In the embodiments according to FIG. 1 the first insulation layer 2 is applied directly on the metallic wire by coating the wire with the varnish, however, also an intermediate surrounding layer may be arranged between the conductor 1 and the first insulation layer 2 for increasing the adhesion between the conductor and the insulation system.

According to another exemplary embodiment a third insulating layer (not shown) is arranged outside and surrounding the second insulation layer 3. The third layer can be applied directly on the second layer and mechanically protects the second insulating layer. The third insulating layer can be made of an unfilled polymer and the polymer is preferably of the same type as the second layer, i.e. any of the following: polyesters, polyesterimides, polyesteramide, polyamideimides, polyimides, polyurethanes, epoxy and polyamides.

Figure 2:
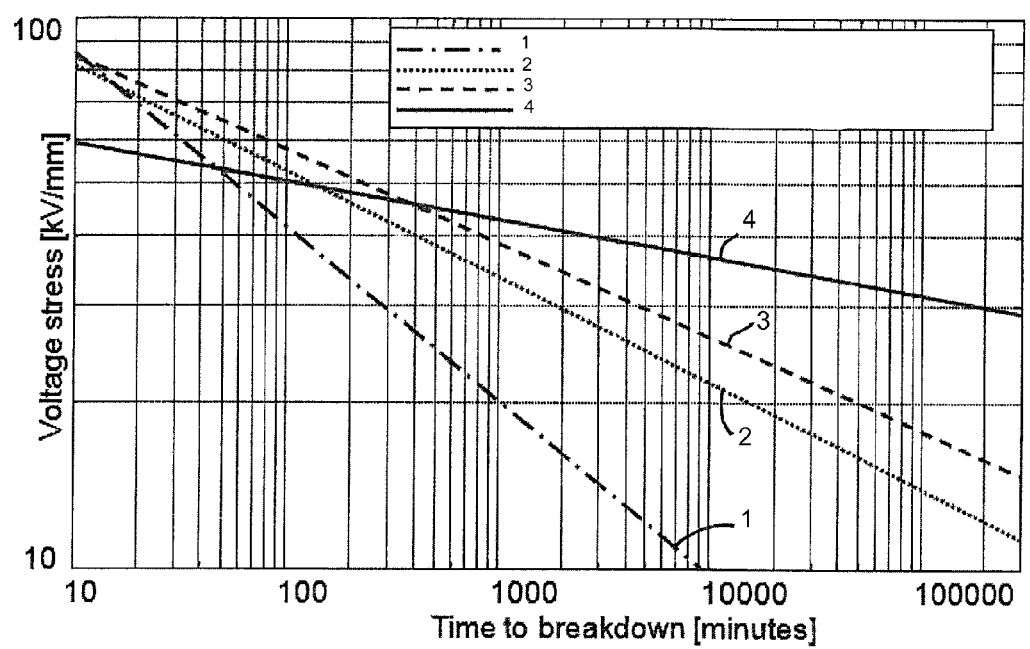
FIG. 2 is a diagram showing lifetime curves for four different types of enameled wires.

The graph in FIG. 2 shows lifetime curves of four different enameled wires, based on generically different insulating coatings. Curve 1 is related to an enameled wire with conventional base coating and a conventional top coating. Curve 2 is related to an enameled wire with nano-filled base coating and a conventional top coating. Curve 3 is related to an enameled wire with a conventional base coating with a corona protective top coating, i.e. a coating comprising chromium oxide and/or iron oxide filler. Curve 4 is related to an enameled wire with a nano-filled base coating and a corona protective top coating. The nano-filled base-coating can be a coating according to the embodiment disclosed in relation to FIG. 1. The lifetime curves are based on measurements of the time to breakdown of twisted pairs of round wires with a conductor diameter of 1.12 mm and insulation grade 2 at 50 Hz AC voltage and at 140° C. The applied voltage stress has been above the Partial Discharge Inception Voltage (PDIV) in all cases. The lifetime curves have been curve fitted to experimental data.

From the curves in FIG. 2 it can be seen that the enameled wire with nano-filled base coating and corona protective top coating, curve 4, according to an embodiment of the invention clearly has the best voltage endurance performance, where its lifetime increases with decreasing voltage stress relative to the other types of wires.

It has also been shown in bending test that the mechanical properties of the enameled wire is improved for an enameled wire with a nano-filled base coating and a corona protective top coating, sample A, compared to an enameled wire with a conventional base coating with a corona protective top coating, sample B. Also, an enameled wire with a nano-filled base coating and a conventional top coating, sample C, was tested. All samples being made of enameled round wires with a conductor diameter of 1.12 mm and insulation grade 2.

The bending test was performed by bending the samples over a 2 mm test bend former to a coil with several turns. Thereafter the samples were aged in a furnace at 200° C. during 48 hours. After the aging the surface of the samples were inspected and it was shown that Sample A and sample C had no cracks at the outer surface of the enameled layer, while Sample B had cracks at the outer surface of the enameled layer. It is believed that for sample A the nano-filled first insulation layer arranged under the second insulation layer distribute the mechanical stress in the insulation layers such that enameled layer is less prone to cracking.

The invention is not limited to the embodiments shown above, but the person skilled in the art may, of course, modify them in a plurality of ways within the scope of the invention as defined by the claims. Thus, the invention is not limited to conductor wires with a round cross-section as shown in the above two embodiments, but may be applied to conductors in the form of a rod, band, or bar, i.e. the conductor is elongated with a round or multi-corner constant cross-section. The insulted conductor may be used in windings for electrical motors, electrical transformers and other electrical equipment in which the insulation of the conductor can be exposed to corona discharges.

What is claimed is:

1. An electrical conductor provided with an electrical insulation system surrounding the electrical conductor, the electrical insulation system comprises a first electrical insulation layer surrounding the conductor and a second electrical insulation layer surrounding the first electrical insulation layer, wherein the second electrical insulation layer comprises a second polymer and a second filler in the form of chromium oxide, iron oxide, or a mixture of chromium oxide and iron oxide, characterized in that the first electrical insulation layer comprises a first polymer and a first filler comprising dispersed nanoparticles.

2. The electrical conductor according to claim 1, wherein the second filler is present in an amount of 10-40% of the volume of the second electrical insulation layer.

3. The electrical conductor according to claim 1, wherein the second filler has an average particle size of 0.005-30 μm.

4. The electrical conductor according to claim 1, wherein the second filler has a resistivity of $10^4$-$10^8$ ohm m.

5. The electrical conductor according to claim 1, wherein the second polymer is at least one of the following polymers: polyesters, polyesterimides, polyamideimides, polyesteramides, polyimides, polyurethanes, epoxy and polyamides.

6. The electrical conductor according to claim 1, wherein the second insulation layer has a thickness of 5-50 μm.

7. The electrical conductor according to claim 1, wherein the first polymer is at least one of the following polymers: polyesters, polyesterimides, polyamideimides, polyesteramides, polyimides, polyurethanes, epoxy and polyamides.

8. The electrical conductor according to claim 1, wherein the nanoparticles are any of the following: Silicon dioxide, Aluminium oxide, Zinc oxide, Titanium dioxide, Barium titanate, Magnesium oxide and Montmorillonite clay.

9. The electrical conductor according to claim 1, wherein the nanoparticles in the first electrical insulation layer are present in an amount of 1-40% of the volume of the first layer.

10. The electrical conductor according to claim 1, wherein the nanoparticles in the first electrical insulation layer have an average particle size of 1-200 nm.

11. The electrical conductor according to claim 1, wherein the first electrical insulation layer has a thickness of 20-120 μm.

12. The electrical conductor according to claim 1, wherein the thickness of the second electrical insulation layer is 10-25% of the first electrical insulation layer.

13. The electrical conductor according to claim 1, wherein the electrical insulation system is an enameled insulation system.

14. The electrical conductor according to claim 1, wherein an additional layer is arranged between the first electrical insulation layer and the second electrical insulation layer.

15. An electrical motor with a winding or coil comprising an electrical conductor according to claim 1.

16. The electrical motor according to claim 15 wherein the electrical motor is a low voltage frequency-converter controlled electrical motor.

17. A transformer with a winding comprising an electrical conductor according to claim 1.

* * * * *